(12) United States Patent
Duguez et al.

(10) Patent No.: US 12,474,331 B2
(45) Date of Patent: Nov. 18, 2025

(54) METHOD OF ISOLATING EXOSOMES

(71) Applicant: UNIVERSITY OF ULSTER, Londonderry (GB)

(72) Inventors: Stephanie Duguez, Londonderry (GB); William Duddy, Londonderry (GB); Owen Connolly, Londonberry (GB)

(73) Assignee: INNOVATION ULSTER LIMITED UNIVERSITY OF ULSTER, TEIC BUILDING, JORDANSTOWN CAMPUS NEWTOWNABBEY, County Antrim Northern Ireland (IE)

( * ) Notice: Subject to any disclaimer, the term of this patent is extended or adjusted under 35 U.S.C. 154(b) by 784 days.

(21) Appl. No.: 17/781,498

(22) PCT Filed: Dec. 4, 2020

(86) PCT No.: PCT/EP2020/084640
§ 371 (c)(1),
(2) Date: Jun. 1, 2022

(87) PCT Pub. No.: WO2021/110920
PCT Pub. Date: Jun. 10, 2021

(65) Prior Publication Data
US 2023/0003726 A1    Jan. 5, 2023

(30) Foreign Application Priority Data

Dec. 4, 2019 (GB) ..................... 1917698

(51) Int. Cl.
*G01N 33/543* (2006.01)
*G01N 33/50* (2006.01)

(52) U.S. Cl.
CPC ... *G01N 33/54326* (2013.01); *G01N 33/5002* (2013.01); *G01N 2400/02* (2013.01)

(58) Field of Classification Search
CPC ....... G01N 33/54326; G01N 33/56966; G01N 33/5002; G01N 2400/02
See application file for complete search history.

(56) References Cited

U.S. PATENT DOCUMENTS

| 2019/0285618 A1 | 9/2019 | Regev et al. | |
| 2021/0128630 A1* | 5/2021 | Mitsialis | C12N 5/0662 |
| 2021/0268030 A1* | 9/2021 | Sandona' | A61K 9/127 |
| 2021/0348114 A1* | 11/2021 | Hudson | G01N 33/92 |

FOREIGN PATENT DOCUMENTS

| JP | 2017525976 A | 9/2017 |
| WO | 2017054086 A1 | 4/2017 |
| WO | 2018081478 A1 | 5/2018 |
| WO | 2019014486 A1 | 1/2019 |
| WO | 2019035880 A1 | 2/2019 |
| WO | 2019081474 A1 | 5/2019 |
| WO | 2019211343 A1 | 11/2019 |

OTHER PUBLICATIONS

International Search Report based on International Application PCT/EP2020/084640 mailed Feb. 26, 2021.
Written Opinion based on International Application PCT/EP2020/084640 Feb. 26, 2021.
Office Action (Decision of Rejection) dated Sep. 11, 2024 in corresponding Chinese Patent Application No. 202080093602X.
Office Action (Notice of Reasons For Rejection) dated Sep. 10, 2024 in corresponding Japanese Patent Application No. 2022-533314.
First Office Action issued Sep. 16, 2023 in corresponding Chinese Patent Application No. 202080093602X (English translation).
Kanagawa, Motoi, "Super Chain Abilities of Dystroglycan and Muscular Dystrophy." 2015, March, Biochemistry, vol. 86, No. 4, pp. 452-463 (publication showing technical common knowledge). (English translation).
Chaun Zhen et al., "Practical Neurology," Shanghai Science and Technology Press, pp. 960-961, Jan. 2014 (English translation).
Cvjetkovic et al., "Detailed Analysis of Protein Topology of Extracellular Vesicles-Evidence of Unconventional Membrane Protein Orientation." Scientific Reports (2016), pp. 1-8, (https://doi.org/10.1038/srep36338)(Abstract).
Cook et al., "The Role of β-Dystroglycan in Nuclear Dynamics". Cells (2024), 13, 431, pp. 1-21, (https://doi.org/10.3390/cells13050431).
Vásquez-Limeta et, al. "Nuclear import of B-dystroglycan is facilitated by ezrin-mediated cytoskeleton reorganization." PLoS One. 2014, vol. 9, Issue 3, (https://doi.org/10.1371/journal.pone.0090629).

* cited by examiner

Primary Examiner — Gailene Gabel
(74) Attorney, Agent, or Firm — Miles & Stockbridge PC; Ajay A. Jagtiani

(57) ABSTRACT

The present invention relates to a method of isolating exosomes. Specifically, the invention relates to a method comprising the steps of providing a sample including exosomes; identifying a cell-surface polypeptide on the exosomes; and isolating the exosomes using the cell-surface polypeptide on the exosomes. The exosomes isolated from by the methods of the invention can be studied for the purposes of biomarker identification, for the understanding of biological function and disease, and to find ways to target them with therapeutics.

11 Claims, 2 Drawing Sheets

METHOD OF ISOLATING EXOSOMES

CROSS-REFERENCE TO RELATED APPLICATIONS

This application is a National Stage of International Application No. PCT/EP2020/084640, filed on Dec. 4, 2020, which claims priority to Great Britain Patent Application No. 1917698.1 filed on Dec. 4, 2019, which is hereby incorporated by reference in its entirety.

BACKGROUND TO THE INVENTION

Exosomes are one type of cell-derived small extracellular membrane vesicles (50-100 nm in diameter) actively secreted by a number of healthy and diseased cell types. Exosomes can mediate cellular, tissue, and organ level micro communication under normal and pathological conditions by shuttling proteins, mRNA, and microRNAs.

It is now recognized that exosomes mediate intercellular communication between different cell types in the body, and thus affect normal and pathological conditions. Several biological entities in exosomes, such as the proteins, mRNA, and microRNAs are closely associated with the pathogenesis of most human malignancies and they may serve as invaluable biomarkers for disease diagnosis, prognosis, and therapy. Many different cell types and tissues secrete exosomes, and the contents and characteristics of exosomes vary depending on the cell type or tissue of origin. Thus the function of exosomes and their relevance to a given pathology can vary depending on the tissue of origin. For this reason, it is increasingly important to isolate tissue-specific sub-types of exosomes.

Exosomes purification and analyses is resultantly a fast growing research field but, regardless of several advances in exosome purification and analyses methods, research still face several challenges.

In order to study exosomes for the purpose of biomarker identification, for the understanding of biological function and disease, and to find ways to target them with therapeutics, it is first necessary to isolate these microscopic structures from the plethora of other molecules and structures found in blood and other biofluids.

Accordingly, there exists a need to provide a provided a method of isolating exosomes.

SUMMARY OF THE INVENTION

According to a first aspect of the present invention, there is provided a method of isolating exosomes, the method comprising the steps of:
(a) providing a sample including exosomes;
(b) identifying a cell-surface polypeptide on the exosomes; and
(c) isolating the exosomes using the cell-surface polypeptide on the exosomes;
wherein the cell-surface polypeptide is dystroglycan (DAG).

Optionally, the method comprises the steps of:
(a) providing a sample including exosomes;
(b) identifying a cell-surface polypeptide on the exosomes;
(c) providing a binding partner for the cell-surface polypeptide;
(d) contacting the binding partner with the sample;
(e) isolating the binding partner, and
(f) isolating the exosome;
wherein the cell-surface polypeptide is dystroglycan (DAG).

Optionally, the sample is a biological sample. Further optionally, the sample is a biological sample from a human.

Optionally, the sample is a biological fluid sample. Further optionally, the sample is a biological fluid sample from a human.

Optionally, the biological fluid sample is selected from cerebrospinal fluid (CSF), peritoneal fluid, pleural fluid, amniotic fluid, interstitial fluid, intravascular fluid, transcellular fluid, and intracellular fluid. Optionally, the biological fluid sample from a human is selected from cerebrospinal fluid (CSF), peritoneal fluid, pleural fluid, amniotic fluid, interstitial fluid, intravascular fluid, transcellular fluid, and intracellular fluid.

Optionally, the sample is a blood sample. Further optionally, the sample is a blood sample from a human. Optionally, the sample is a whole blood sample. Further optionally, the sample is a whole blood sample from a human. Optionally, the sample is a serum sample. Further optionally, the sample is a serum sample from a human. Preferably, the sample is a serum sample from a human.

Optionally, the sample is a biological tissue sample. Further optionally, the sample is a biological tissue sample from a human. Optionally, the sample comprises a biological tissue. Further optionally, the sample comprises a biological tissue from a human.

Optionally, the sample is a biological soft tissue sample. Further optionally, the sample is a biological soft tissue sample from a human. Optionally, the sample comprises a biological soft tissue. Further optionally, the sample comprises a biological soft tissue from a human.

Optionally, the biological tissue is selected from endoderm tissue, mesoderm tissue, and ectoderm tissue. Optionally, the sample comprises a biological tissue selected from endoderm tissue, mesoderm tissue, and ectoderm tissue. Further optionally, the sample comprises a biological tissue from a human selected from endoderm tissue, mesoderm tissue, and ectoderm tissue.

Optionally, the mesoderm tissue is paraxial mesoderm tissue.

Optionally, the mesoderm tissue is muscle tissue.

Optionally, the muscle tissue is selected from skeletal (striated) muscle tissue; smooth (non-striated) muscle tissue; and cardiac (semi-striated) muscle tissue.

Optionally, the muscle tissue comprises cells selected from skeletal (striated) muscle cells; smooth (non-striated) muscle cells; and cardiac (semi-striated) muscle cells.

Optionally, the muscle tissue comprises cells selected from skeletal (striated) myoblasts; smooth (non-striated) myoblasts; and cardiac (semi-striated) myoblasts.

Optionally, the muscle tissue comprises cells selected from skeletal (striated) myotubes; smooth (non-striated) myotubes; and cardiac (semi-striated) myotubes. Preferably, the muscle tissue comprises smooth (non-striated) myotubes.

Optionally, the cell-surface polypeptide is human dystroglycan (DAG).

Optionally, the cell-surface polypeptide is human dystroglycan (DAG) defined by UniProtKB Accession No Q14118.

Optionally, the cell-surface polypeptide is selected from alpha-dystroglycan and beta-dystroglycan.

Optionally, the cell-surface polypeptide is selected from human alpha-dystroglycan and human beta-dystroglycan. Preferably, the cell-surface polypeptide is human alpha-dystroglycan.

Optionally, the binding partner for the cell-surface polypeptide is capable of binding to the cell-surface polypeptide.

Optionally, the binding partner for the cell-surface polypeptide is an antibody capable of binding to the cell-surface polypeptide.

Optionally, the antibody is selected from a monoclonal antibody capable of binding to the cell-surface polypeptide and a polyclonal antibody capable of binding to the cell-surface polypeptide. Preferably, the antibody is a monoclonal antibody capable of binding to the cell-surface polypeptide.

Optionally, the antibody is an IgG isoform. Further optionally, the antibody is an IgG2 isoform. Still further optionally, the antibody is an IgG2a isoform. Still further optionally, the antibody is an MIgG2a isoform. Preferably, the antibody is an MIgG2a isoform.

Optionally, the binding partner for the cell-surface polypeptide comprises an antibody capable of binding to the cell-surface polypeptide and a solid support.

Optionally, the solid support is a bead.

Optionally, the solid support is a hydrophilic bead.

Optionally or additionally, the solid support is a pH neutral bead.

Optionally, the solid support is an epoxy bead. Further optionally, the solid support is an epoxy-coated bead. Still further optionally, the solid support is a bead having an epoxy group.

Optionally, the solid support is a magnetic bead. Further optionally, the solid support is a paramagnetic bead. Still further optionally, the solid support is a superparamagnetic bead. Preferably, the solid support is a superparamagnetic bead.

Optionally, the bead has a diameter of 1.0-4.5 μm. Preferably, the bead has a diameter of 2.8 μm.

BRIEF DESCRIPTION OF THE DRAWINGS

Embodiments of the invention will now be described with reference to the accompanying drawings in which.

MATERIAL AND METHODS

Participants and Ethical Approvals

Deltoid muscle biopsies from healthy subjects were obtained from the BTR (Bank of Tissues for Research, a partner in the EU network EuroBioBank) in accordance with European recommendations and French legislation.

Serum samples were obtained from Parkinson Disease patients and from healthy age and gender-matched subjects. The protocol (NCT02305147) was approved by the local Ethical Committee and all subjects signed an informed consent in accordance with institutional guidelines.

Muscle Stem Cell Extraction and Culture

Briefly, muscle biopsies were dissociated mechanically as previously described in (Bigot et al., 2015), and plated in proliferation medium [1 volume of M199, 4 volumes of Dulbecco's modified Eagle's medium (DMEM), 20% foetal bovine serum (v:v), 25 ug·ml$^{-1}$ Fetuin, 0.5 ng·ml$^{-1}$ bFGF, 5 ng·ml$^{-1}$ EGF, 5 ug·ml−1 Insulin]. The myogenic cell population was enriched using CD56 magnetic beads, and for their myogenicity using anti-desmin antibodies as described before (Bigot et al., 2015). A minimum of 80% of the cell population were positive for desmin. Myoblasts were then immortalized as previously described (Thorley et al., 2016). The immortalized myoblasts were then differentiated into myotubes, after rinsing them 3 times with DMEM to remove any FBS residual, and culturing them in DMEM for 3 days.

Serum Sample

Briefly, blood samples were collected by venipuncture using red top tubes and allowed to clot for 30 minutes at room temperature. After centrifugation at 4,000 g for 10 minutes at 4° C., serum were snap frozen on dry ice and kept at −80° C. until processing.

EXAMPLES

Embodiments of the invention will now be described with reference to the following non-limiting examples:

Example 1

Isolation of Muscle Exosomes

To determine whether the polypeptide dystroglycan (DAG) was present inside muscle exosomes or at the surface (membrane-embedded and therefore accessible to antibodies), it was tested whether commercially available anti-DAG antibodies (targeting different forms of the polypeptide) were capable of binding to muscle exosomes extracted from cell culture medium.

To achieve this, two converse tests were applied: (1) were exosomes pulled down by commercially available anti-DAG antibodies positive for exosomal markers?; and (2) were exosomes pulled down by exosomal markers positive for the polypeptide dystroglycan (DAG)? In this way, only if the form of the polypeptide dystroglycan (DAG) targeted by the commercially available anti-DAG antibodies was present at the surface of the exosome, would a positive result be returned for both of these tests.

Figure 1:
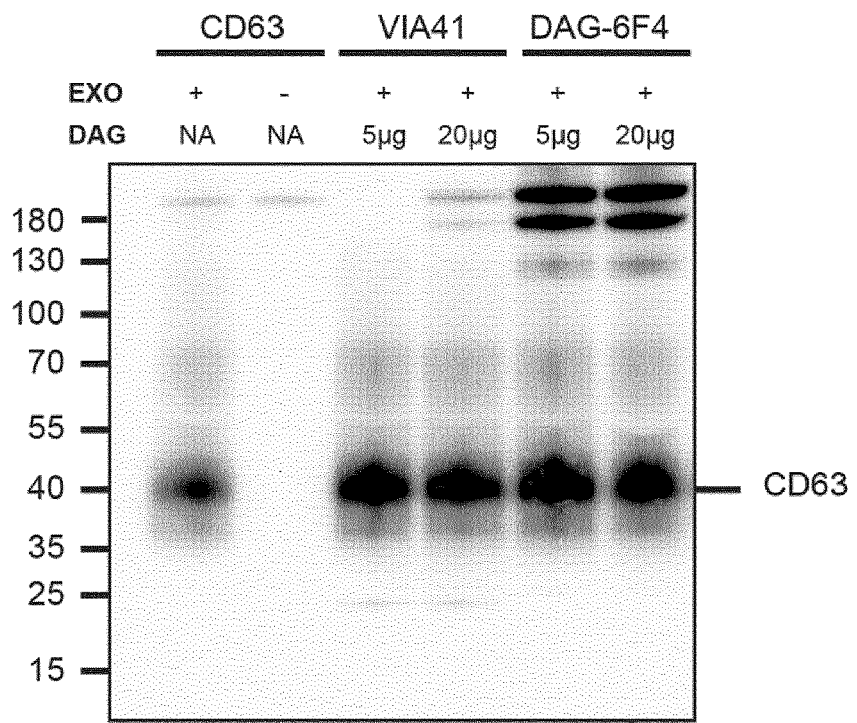
FIG. 1 is a western blot analysis of the culture media of myoblasts from healthy human subjects, cultured to form differentiated myotubes.

Using this approach, it was shown that we were able to identify that alpha-dystroglycan (encoded by the gene DAG1) was accessible to antibodies and therefore amenable to immunoaffinity pull-down (see FIG. 1).

In short, myoblasts from muscle biopsies from healthy human subjects were isolated and cultured to form differentiated myotubes as described above. Exosomes were isolated from the culture medium of 800,000 muscle cells following 3 days of culture, using total exosome isolation reagent according to the manufacture's instructions.

For isolation of exosomes from cell culture media, Total Exosome Isolation Reagent (from cell culture media; Life Technologies™) was added to cell culture media at a ratio of 1:2 volumes and let incubate overnight at 4° C. Exosomes were then pelleted by centrifugation at 10,000×g for 60 min and depleted media was discarded. Exosome pellets were resuspended in 200 μl of PBS and stored at −80° C. until required.

Isolated exosomes from culture medium were then subjected to immunoaffinity purification using either anti-CD63 antibody, VIA41 anti-DAG antibody, or DAG-6F4 anti-DAG antibody. For co-immunoprecipitation (Co-IP) of isolated muscle exosomes from cell culture media, α-DAG antibody (DAG-6F4; DSHB) was coupled to Dynabeads™ M-270 epoxy beads (Life Technologies™) using the Dynabeads™ antibody coupling kit (Life Technologies™) according to manufacturer's instructions.

Briefly, 5 μg of antibody was coupled to 1 mg of beads and incubated at room temperature (RT) for 16-24 hours with gentle agitation. Beads were then washed with the supplied wash buffers and stored as suggested until required.

Next, 1 mg of α-DAG coated beads were aliquoted to individual IP conditions and washed with 900 μl of 1× IP buffer (Life Technologies™) containing 100 mM NaCl. Beads were then captured with a PureProteome™ magnetic stand and the exosome suspensions prepared above were diluted to 400 μl, added to the α-DAG coupled beads and let incubate at RT for 3 hours with end-over-end rotation.

Next, beads were magnetically captured, and supernatant kept for analysis of exosome depletion. Beads were then washed twice with 1 ml of PBS-BSA (0.1%) and exosomes were either lysed directly from the beads or eluted from the beads depending upon downstream applications.

For western blotting and detection of CD63 and CD81 tetraspanin proteins, exosomes were lysed under non-reducing conditions by adding 15 μl of 4× NuPAGE™ LDS buffer to the beads and incubating on ice for 30 mins. Beads were then magnetically captured and protein was transferred into a new tube and heated at 70° C. for 10 min. 45 μl of protein was then loaded in a NuPAGE™ 4-12% Bis-tris Midi gel (Life Technologies™) and run at 200 v for 50 mins in 1× NuPAGE™ MOPS SDS running buffer (Life Technologies™) before being transferred to polyvinylidene difluoride (PVDF) membranes using the iblot® Dry Blotting System (Life Technologies™).

Immunoblotting was performed using the ibind™ Flex Western System and primary antibodies (CD81, clone M38 & CD63, clone Ts63; 1:1,000 dilution; Life Technologies™) with appropriate secondary antibody (Goat anti-mouse HRP, 1:4,000 dilution). Chemiluminescent signal was detected using Pierce™ ECL Western blotting substrate and the UVP ChemiDoc-It2 imager.

In all cases, the pulled-down material was positive for CD63 exosomal marker, proving that anti-DAG was capable to pull-down muscle exosomes.

Example 2

Immunocapture of Cell Culture Exosomes from Serum

To test whether immunocapture of muscle exosomes from a complex starting material like blood serum would be hampered by competition from endogenous serum IgGs, muscle exosomes from cell culture media were injected into the human serum samples obtained from the Parkinson Disease patients and healthy age and gender-matched subjects (protocol NCT02305147 as described above, and the Co-IP performed as described above.

In short, 200 μl of serum from healthy subjects (H) was injected with muscle exosomes from culture media secreted during 3 day culture of 800,000 myoblasts differentiated into myotubes. Serum containing injected exosomes was then incubated for 3 h with approx. 6.7×10$^7$ magnetic beads coated in anti-DAG1 antibody (DAG-6F4 deposited to the Developmental Studies Hybridoma Bank (DSHB) by Morris, G. E. as DSHB Hybridoma Product DAG-6F4. A magnetic stand was used to capture and wash the beads as described above. Captured muscle exosomes were then cleaved with NuPAGE buffer and loaded into a gel for western blot analysis using the antibodies specific to exosomal markers, CD63 and CD81 as described above.

Figure 2:
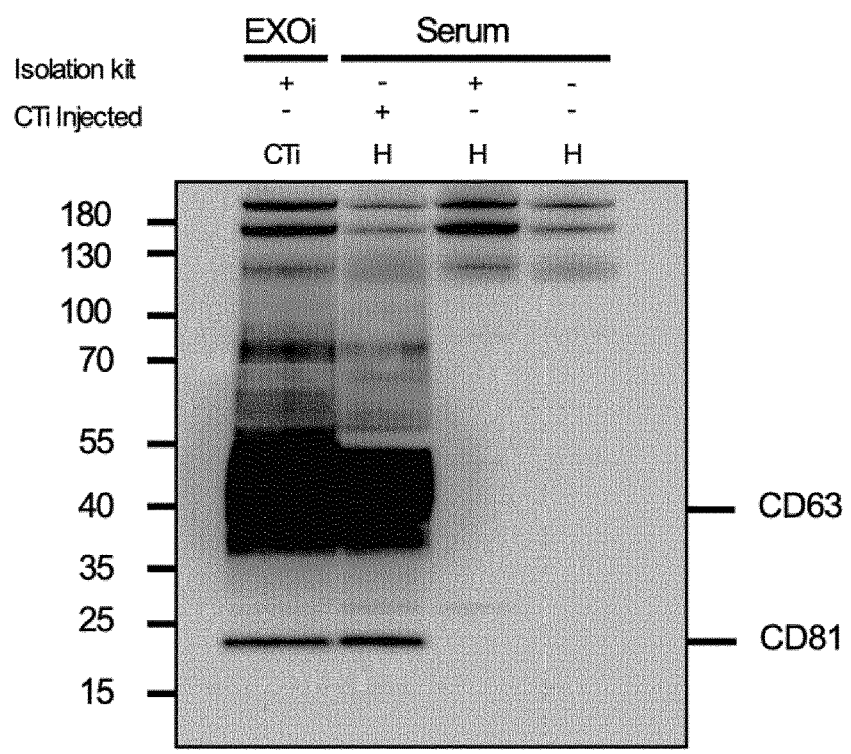
FIG. 2 is a western blot analysis of immunocapture of cell culture exosomes from serum.

Exosomes from cell culture media were successfully isolated from human serum samples thus confirming that anti-DAG1 beads were capable of capturing exosomes from a biofluid without significant interference from endogenous antigens (see FIG. 2).

Example 3

Circulating Muscle Exosome Extraction

To test whether circulating muscle exosomes could be isolated from blood serum using an anti-DAG1 immunoaffinity approach, blood serum from human subjects was used.

In short, for isolation of exosomes from human serum samples, 200 ul of serum was first cleared of debris by centrifugation at 2000×g for 30 mins. Next, Total Exosome Isolation Reagent (from serum; Life Technologies™) was used to isolate exosomes according to the manufacturers' instructions, but with modified volumes. Specifically, 20 μl of isolation reagent was added to serum samples instead of the recommended 40 μl, and samples were vortexed and allowed to incubate on ice for 30 mins prior to centrifugation at 10,000×g for 10 min. Supernatants were then removed and stored for downstream analysis of exosome depletion, and pellets were resuspended in 200 μl of PBS and stored at −80° C. until required.

Figure 3:
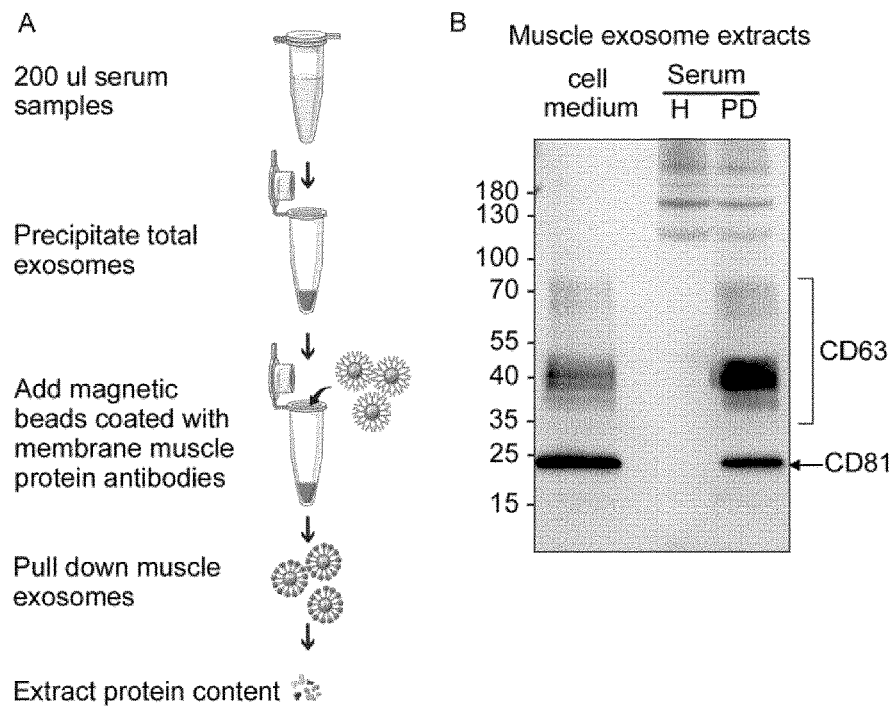
FIG. 3A is a schematic diagram of the isolation of muscle exosomes.
FIG. 3B is a western blot analysis of circulating vesicles pulled down by an antibody capable of binding to a cell-surface polypeptide (muscle membrane protein)

Exosomes were precipitated from 200 μl of serum as described above. Total circulating exosomes were then incubated for 3 h with magnetic beads coated in anti-DAG1 antibodies as described above. Beads were then isolated and washed using a magnet as described above. Protein from the muscle exosomes were then extracted using NuPAGE buffer and loaded onto a gel for western blot analysis (see FIG. 3A). Western blot analysis showed that the vesicles pulled down by the antibody targeting the muscle membrane protein are positive for exosomal markers CD63 and CD81, proving the feasibility of an immunoaffinity approach using anti-DAG1 to isolate muscle exosomes from blood serum (see FIG. 3B).

Example 4

Immunocapture of Circulating Muscle Exosomes from Healthy Subjects

To determine whether circulating muscle exosomes could be isolated from the serum of healthy controls with the anti-DAG1 beads the sample volume was increased to 500 μl and the immunoprecipitation carried out as described above. The ability of different elution buffers to cleave captured exosomes from the anti-DAG1 isolation beads was also tested.

In short, exosomes were precipitated from 500 μl of serum. Total circulating exosomes were then incubated for 3 h with magnetic beads coated in anti-DAG1 antibody as described above. A magnetic stand was used to capture and wash the beads as described above. Captured muscle exosomes were then cleaved using either NuPAGE buffer (NP), 8 M urea buffer, or a commercial elution buffer (EB) and loaded into a gel for Western blot analysis using antibodies specific to exosomal markers, CD63 and CD81 as described above.

Figure 4:
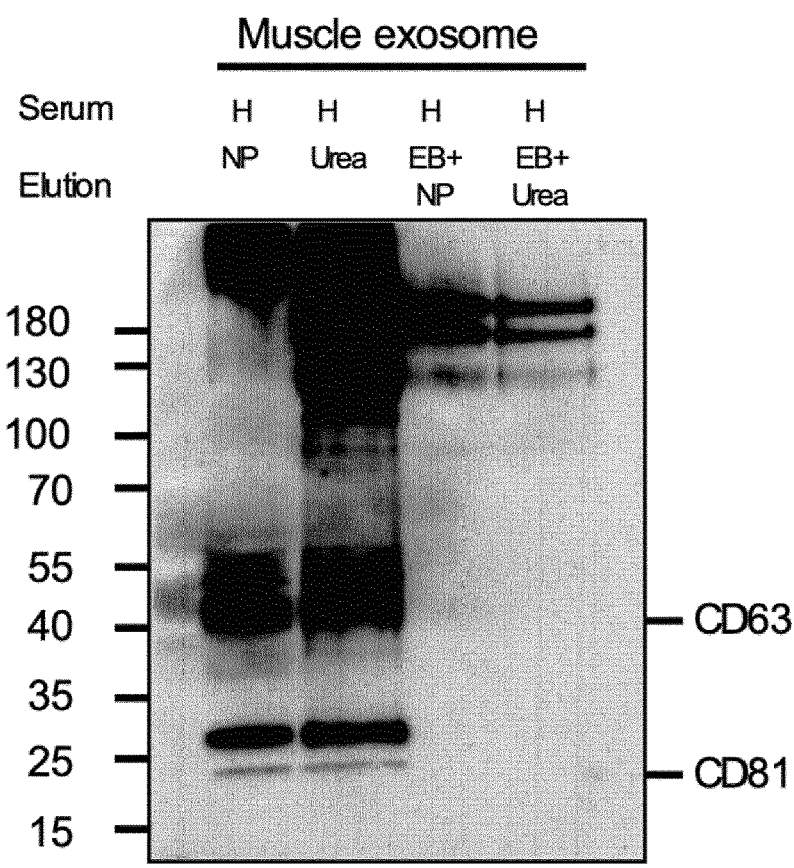
FIG. 4 is a western blot analysis of immunocapture of circulating muscle exosomes from healthy subjects (H).

Muscle exosomes, positive for CD63 and CD81, were successfully captured from the sera of healthy controls following an increase in sample volume (see FIG. 4). A test of different elution buffers also identified that NuPAGE buffer and 8 M Urea buffer were most effective in cleaving captured exosomes relative to a low pH elution buffer.

The invention claimed is:

1. A method of isolating exosomes, the method comprising the steps of:
   (a) providing a binding partner that binds to a dystroglycan (DAG) polypeptide present on the cell surface of exosomes;
   (b) providing a sample that includes exosomes;
   (c) contacting said binding partner with the sample under conditions that allow the binding partner to bind to the DAG polypeptide present on the cell surface of the exosomes;
   (d) isolating the binding partner after step (c) and
   (e) eluting the exosomes from the binding partner of step (d).

2. The method according to claim 1, wherein the sample is a biological fluid sample.

3. The method according to claim 1, wherein the sample is a serum sample.

4. The method according to claim 1, wherein the sample comprises a biological tissue.

5. The method according to claim 1, wherein the sample comprises a biological tissue selected from endoderm tissue, mesoderm tissue, and ectoderm tissue.

6. The method according to claim 5, wherein the mesoderm tissue is muscle tissue.

7. The method according to claim 6, wherein the muscle tissue comprises cells selected from skeletal (striated) muscle cells; smooth (non-striated) muscle cells; and cardiac (semi-striated) muscle cells.

8. The method according to claim 1, wherein the cell-surface polypeptide is alpha-dystroglycan.

9. The method according to claim 1, wherein the binding partner for the cell-surface polypeptide is an antibody capable of binding to the cell-surface polypeptide.

10. The method according to claim 1, wherein the binding partner for the cell-surface polypeptide comprises an antibody capable of binding to the cell-surface polypeptide and a solid support.

11. The method according to claim 10, wherein the solid support is a magnetic bead.

* * * * *